Dec. 30, 1958   H. J. M. LAMBERT ET AL   2,866,239
MORTISE AND TENON JOINT
Original Filed Dec. 8, 1948                     2 Sheets-Sheet 1
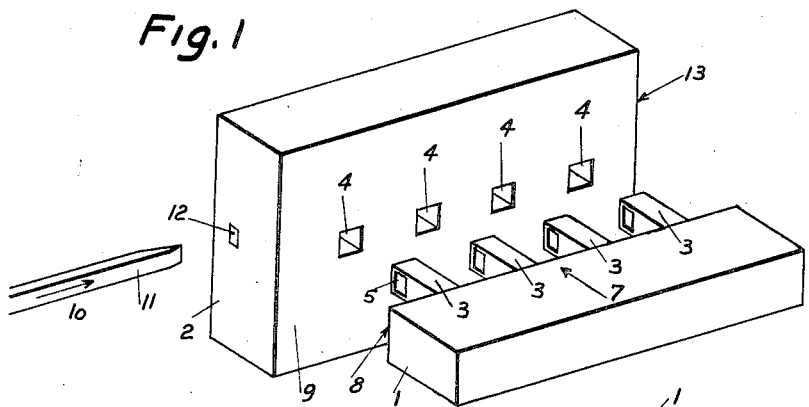
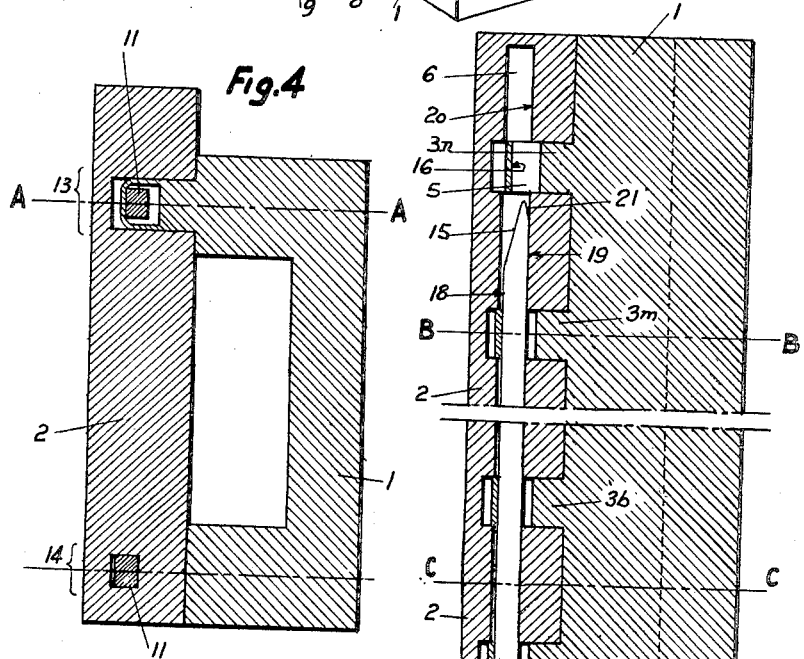
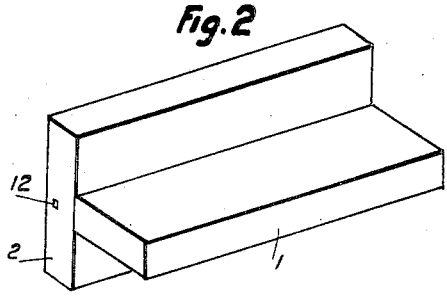
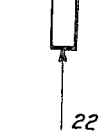
Henri Jacques Marc Lambert
Georges Paul Mongin
INVENTORS
By Richardson and David
their ATTYS.

Dec. 30, 1958
H. J. M. LAMBERT ET AL
2,866,239
MORTISE AND TENON JOINT
Original Filed Dec. 8, 1948
2 Sheets-Sheet 2
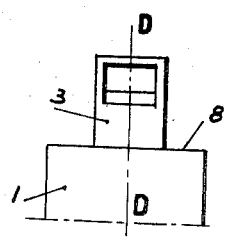
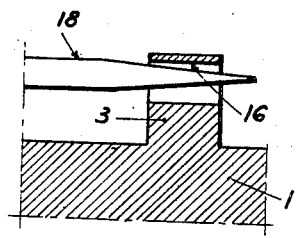
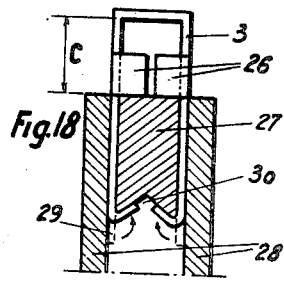
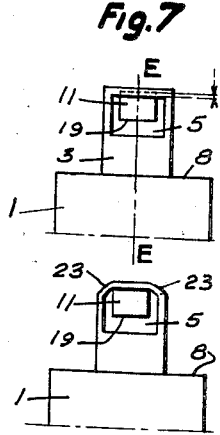
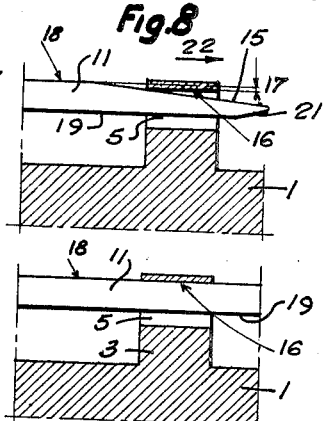
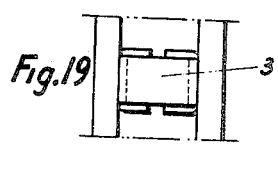
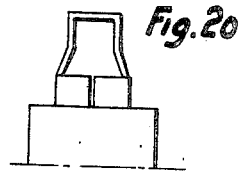
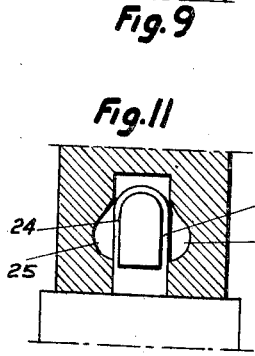
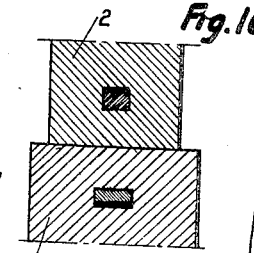
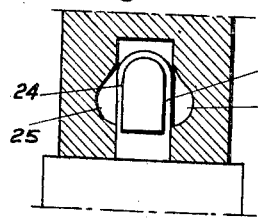
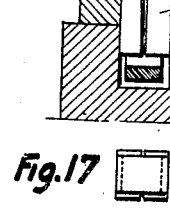
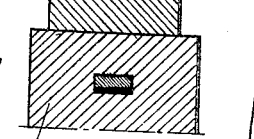
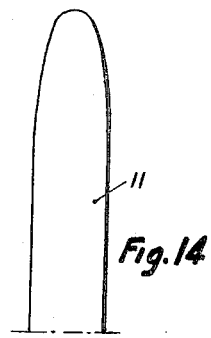
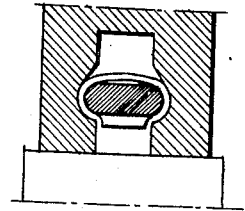
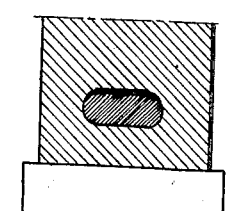
Henri Jacques Marc Lambert
Georges Paul Mongin
INVENTORS
By Richardson and David
their ATTYS.

United States Patent Office 2,866,239
Patented Dec. 30, 1958

2,866,239

MORTISE AND TENON JOINT

Henri Jacques Marc Lambert, Sevres, and Georges Paul Mongin, Saint-Gratien, France Continuation of application Serial No. 64,112, December 8, 1948. This application February 9, 1954, Serial No. 409,192

Claims priority, application France December 15, 1947

2 Claims. (Cl. 20—92)

The present invention relates to a mortise and tenon joint, and more particularly to a joint of this character by means of which a tenon member is locked into assembled relationship with a mortised member by means of a slightly deformable drift pin which cooperates with deformable walls at the ends of the tenons.

This application is a continuation of our copending application Serial No. 64,112, filed December 8, 1948 for Methods for Assembling Two or More Elements, now abandoned.

The inconveniences of this traditional method lie mainly in the fact that a multiplicity of pins, pegs or rivets increases the cost of production and at many points produces irregularities in the surface of the elements which are fitted together. In the case where these elements have to be painted or otherwise finished, it is neceessary to fill in the irregularities at the points of pinning, pegging or riveting followed by a base coating, which is a relatively expensive procedure. Moreover, the strain to which these elements are subjected cause an inevitable working loose of the fillings which often crack and become conspicuous.

The present invention avoids these difficulties by the provision of a plurality of aligned tenons on the tenon member, these tenons having a series of aligned holes formed therein near the ends of the tenons. The holes are arranged to have deformable or resilient walls. The mortised member has a series of mortises formed therein which are complementary to and which receive the tenons. The mortises are interconnected by an elongated rectilinear passage. In one embodiment of the invention, a slightly deformable drift pin is passed through the passage in the mortised member and also passes through the aligned holes in the tenons. Without the drift pin in place, and with the mortised member and tenon member in assembled relationship, the distance from the walls of the elongated passage of the mortised member nearest to the tenon member to the inner surfaces of the end walls of the holes in the tenons is slightly less than the transverse dimension of the drift pin in its direction of greatest deformability. As a result, the end walls of the tenons and the drift pin are both slightly deformed after insertion of the drift pin, thus locking the mortised member and the tenon member in assembled relationship by the combined forces of both deformations.

In another embodiment of the invention, the walls of the aligned holes in the tenons are laterally deformed.

Other features and advantages of the invention will become apparent upon reading the following specification together with the accompanying drawing forming a part hereof.

Referring to the drawing:

Figure 1 is a perspective view showing a tenon member, a mortised member and a drift pin positioned ready for assembly.

Figure 2 is a perspective view showing the members of Fig. 1 after assembly.

Figure 3 is a longitudinal sectional view taken along the line A—A of Fig. 4, the members being assembled along two spaced parallel lines.

Figure 4 is a transverse sectional view, the upper portion being taken along the line B—B of Fig. 3 and the lower portion along the line C—C of Fig. 3.

Figure 5 is an end view showing an arrangement providing reduced deformation to permit disassembly of the two members.

Figure 6 is a longitudinal sectional view taken along the line D—D of Fig. 5.

Figure 7 is an end view of an arrangement in which appreciable deformation is provided for the purpose of permanently assembling the two members, the drift pin having not yet been forced into locking position.

Figure 8 is a longitudinal sectional view taken along the line E—E of Figure 7.

Figures 9 and 10 are similar to Figs. 7 and 8, respectively, with the drift pin in locking position.

Figure 11 is a transverse sectional view of a form of the invention in which the holes in the ends of the tenons are adapted to be enlarged laterally showing the holes prior to insertion of the drift pin.

Figure 12 shows the form of the invention illustrated in Fig. 11 with the drift pin in locking position.

Figure 13 is a transverse sectional view similar to Fig. 12, except that it is taken intermediate two tenons.

Figure 14 is a fragmentary plan view showing the rounded end of a relatively flat drift pin suitable for use with Figs. 11 to 13.

Figure 15 is a transverse sectional view of a modified form of the invention in which double-ended tenons are used for the assembly of two mortised members.

Figure 16 is a view similar to Fig. 15, except that it is taken intermediate two tenons.

Figure 17 is a plan end view of the double-ended tenon shown in Fig. 15.

Figure 18 is a transverse sectional view showing a form of tenon adapted for use with hollow members such as boxes.

Figure 19 is a plan view of the tenon shown in Fig. 18.

Figure 20 is an elevational view of a tenon provided with an enlarged circular centering portion.

Figure 21 is a plan view of the tenon shown in Fig. 20.

Referring to Fig. 1, a tenon member 1 is shown positioned to be assembled with a mortised member 2. The tenon member 1 is provided with a plurality of aligned spaced tenons 3. The mortised member 2 has a plurality of aligned spaced mortises 4 formed therein which are complementary to and which receive the tenons 3. As may be seen in Figs. 3 and 4, the mortises are deeper than the length of the tenons. The tenons 3 have aligned holes 5 formed therein near the ends thereof to provide both laterally and longitudinally deformable end walls, which deformation may be of a resilient nature, provided however, that deformation of a permanent nature is accompanied by sufficient permanent locking force to hold the members 1 and 2 locked in assembled relationship as described below.

The mortised member 2 has an elongated passage 6 formed therein which interconnects the mortises 4. The elongated passage 6 is generally in alignment with the holes 5 in the ends of the tenons 3. The mortised member 2 and tenon member 1 are assembled by moving the tenon member 1 in the direction of the arrow 7 (Fig. 1) so that the tenons 3 are inserted in the mortises 4 and the surface 8 of tenon member 1 bears against the surface 9 of mortised member 2.

The two members 1 and 2 are locked in assembled relationship by the movement in the direction of the arrow 10 (Fig. 1) of a slightly deformable drift pin 11 whereby the drift pin 11 is inserted in the terminal aperture 12 of the elongated passage 6. The two members 1 and 2, when assembled, will have the appearance shown in Fig. 2, the drift pin 11 being completely inserted in elongated passage 6 so that only the terminal aperture 12 is visible. The cross-sectional configuration of drift pin 11 provides a greater cross-sectional moment of inertia in a first direction than in a second direction normal to the first direction. Deformation of the drift pin 11 is illustratively shown as being in the second direction which is of lesser cross-sectional moment of inertia.

Referring to Figs. 3 and 4, the tenon member 1 is of channel shaped cross section and the two members 1 and 2 are assembled along two spaced parallel lines 13 and 14 of mortises 4 and tenons 3. In Fig. 3 the drift pin 11 is shown partially inserted in elongated passage 6 after having passed through the holes 5 in tenons 3a, 3b and 3m, the drift pin 11 being about to enter the hole 5 in tenon 3n. The inner end portion of drift pin 11 terminates in a sloping face 15. The sloping face 15 will press gradually against the inner end wall surface 16 of the hole 5 in tenon 3n as the drift pin 11 is further progressively inserted in elongated passage 6.

Figs. 7 to 10 show the respective positions of pin 11 and aperture 5 of a tenon 3 before and after pin 11 is inserted in said aperture 5. As shown in Figs. 7 and 8, pin 11 before being forced into locking position is partially engaged by its end in the aperture 5. This end is provided with two sloping faces 15 and 21. Sloping face 15 constitutes an extension of the lateral surface 18 of drift pin 11 which is farthest from tenon member 1, while sloping surface 21, adjacent to sloping face 15, constitutes an extension of the opposite lateral surface 19 of pin 11. When sloping face 15 is only engaged in aperture 5, the position of pin 11 is such that its lateral face 18 is shifted from the inner wall surface 16 of the hole 5 through a distance 17. This shifting is due to the fact that the distance from the walls 20 of the passage 6 nearest to the tenon member 1, to the inner surface 16 of the end walls of the tenons 3 which are farthest from the tenon member 1, is slightly less than the transverse dimension of the drift pin 11 between its lateral surfaces 18 and 19.

The result is that in pushing drift pin in the direction of arrow 22, the lateral surface 18 of pin 11 presses against the inner wall 16 of aperture 5. This wall 16 is displaced through distance 17 and consequently is resiliently deformed at 23 (Fig. 9), so that aperture 5, of a substantially rectangular shape as shown in Fig. 7, becomes correspondingly arcuated at 23 (Fig. 9). Due to the counter-thrust exerted by wall 16 against pin 11 while inserting the latter into aperture 5, drift pin 11 is also slightly deformed and sloping surface 21 tends to bear against the surface 20 of elongated passage 6 (Fig. 3), but facilitates a further inserting movement of pin 11 by reason of its declivity.

When fully inserted, pin 11 has its lateral surface 18 bearing against the inner wall surface 16 of a hole 5 of a tenon 3, as shown in Fig. 10.

Moreover, both the end walls of the tenons 3 and the drift pin are slightly deformed, whereby the combined forces accompanying both of these slight deformations will hold members 1 and 2 locked in assembled relationship.

Where a lesser amount of locking action is desired, in order to permit disassembly, the form of construction shown in Figs. 5 and 6 may be used. In Figs. 5 and 6, the amount of deformation is greatly reduced or is negligible, thereby permitting the drift pin to be withdrawn.

Figs. 11 to 14 show a modified form of the invention in which the elongated passage 6 is wider than the mortises. The drift pin 11 is wider than the holes 5 in the ends of the tenons prior to their deformation by insertion of the drift pin 11. The mortise 4 is laterally enlarged adjacent to the elongated passage 6 to provide spaces 25 at both sides of the deformable lateral walls 24 of the holes in the end portions of the tenons 3. After insertion of the drift pin 11, the walls 24 of the hole are laterally deformed from their condition as shown in Fig. 11 to a condition as shown in Fig. 12. Intermediate the mortises 4, the shape of the elongated passage 6 is as shown in Fig. 13, the cross-sectional configuration of drift pin 11 being modified to be relatively wide and flat as shown in Figs. 12 and 13. In order to facilitate insertion of the drift pin 11 and lateral deformation of the tenon walls 24, the drift pin 11 is provided with a tapering rounded end as shown in Fig. 14.

Figs. 15, 16 and 17 show two mortised members locked in assembled relationship by means of a double-ended tenon 3. The tenons 3 are first locked in member 1 by means of a relatively wide drift pin which produces no deformation of the end of the tenon since no stress is applied thereto at this time. Thereafter, the mortised member 3 is assembled over the free ends of the double-ended tenons and a narrower drift pin is inserted through the upper ends of the tenons, producing a deformation of the end walls of the tenon as described above and shown in Fig. 15. The combined forces of deformation of the tenons and the drift pin lock the members 1 and 2 in assembled relationship as previously described.

In the example of Figures 18 and 19, flaps 26 serve as a support for tenon 3 at the time when it is mounted on piece 27 in such a manner that the dimension C should remain precise. In this way the desired pressure will be obtained due to the clearance 17 (Figure 8). In this example, tenon 3 is secured on element 27 before the securing of plates 28 and this is performed by folding and jamming the ends 29 of the tenon behind piece 27, preferably in a V shaped retaining groove 30.

The elongated passage 6 is shown in the drawings as rectilinear. It is to be understood, however, that the passage 6 may be generally rectilinear. By generally rectilinear it is intended that passage 6 may be slightly curved, provided that the radius of curvature is sufficiently large and the drift pin 11 is sufficiently flexible to permit the drift pin 11 to be inserted into the passage 6 and to conform to the curvature of the elongated passage 6 as it is progressively inserted therein without requiring undue force to complete the assembly.

We claim:

1. A mortise and tenon joint for locking two pieces into assembled relationship, comprising a tenon member integral with one of said pieces, a plurality of aligned spaced tenons disposed on said tenon member, said tenons having aligned holes formed therein, said holes being defined by deformable walls at and adjacent to the ends of said tenons; a mortised member integral with the other of said pieces, a plurality of aligned spaced mortises formed in said mortised member complementary to and engaged by said tenons, said mortises being of a depth greater than the length of said tenons, said mortised member further having an elongated generally rectilinear passage formed therein interconnecting said mortises and terminating in an aperture at an external surface of said mortised member, and a resiliently transversally deformable drift pin disposed in said passage and passing through said holes, causing thereby said pieces to be in joined condition along cooperating surfaces, an end wall of each tenon member being deformable in the longitudinal direction of said tenons, the distance from the walls of said elongated passage nearest to said tenon member to the inner surfaces of said end walls of said tenons with said pieces in assembled relationship without the drift pin in place being slightly less than the transverse dimension of said drift pin in said longitudinal direction, whereby both the drift pin and the tenon end walls are resiliently deformed, the direction of said deformations being along the longitudinal direction of said tenons and the combined forces accompanying both of said deformations acting to lock said pieces in assembled relationship.

2. A mortise and tenon joint according to claim 1 wherein the cross-sectional configuration of said drift pin provides a greater cross-sectional moment of inertia in a first direction than in a second direction normal to said first direction, said resilient deformation of said drift pin being in said second direction of lesser cross-sectional moment of inertia.

References Cited in the file of this patent

UNITED STATES PATENTS

| | | |
|---|---|---|
| 695,677 | Faris | Mar. 18, 1902 |
| 1,214,261 | Balbach | Jan. 30, 1917 |
| 1,649,903 | Kessler | Nov. 22, 1927 |
| 2,414,628 | Battin | Jan. 21, 1947 |